United States Patent [19]

Blöse

[11] 3,862,873

[45] Jan. 28, 1975

[54] DEVICES TO MANUFACTURE LARGE WEBS OR SHEETS OF SYNTHETIC FOIL MATERIAL FROM EXTRUDED STRIPS JOINED TOGETHER ALONG THEIR EDGES

[75] Inventor: Werner Blöse, Hamburg, Germany

[73] Assignee: Schlegel GmbH, Hamburg, Germany

[22] Filed: June 8, 1973

[21] Appl. No.: 368,104

Related U.S. Application Data

[62] Division of Ser. No. 169,615, Aug. 6, 1971, Pat. No. 3,765,982.

[30] Foreign Application Priority Data

Aug. 7, 1970 Germany............................ 2039236

[52] U.S. Cl.................. 156/500, 425/113, 425/224, 425/375
[51] Int. Cl............................................... B29b 5/00
[58] Field of Search ............ 156/244, 500; 425/113, 425/214, 224, 325, 327, 375, 464, 470; 264/177 R

[56] References Cited
UNITED STATES PATENTS

| 1,903,570 | 4/1933 | Kremmling | 425/375 |
| 2,742,000 | 4/1956 | Hansen et al. | 425/375 |

Primary Examiner—Charles E. Van Horn
Assistant Examiner—Caleb Weston

[57] ABSTRACT

A device for manufacturing large webs or sheets of synthetic foil material from extruded strips joined together along their edges, comprising an extruder means mounted for reciprocating motion, guide means for guiding said extruder, means for driving said extruder, said driving means moving said extruder back and forth between first and second end positions, support means for deposition of the extruded strip from said extruder and means for moving said support means crosswise to the direction of movement of said extruder means.

8 Claims, 3 Drawing Figures

DEVICES TO MANUFACTURE LARGE WEBS OR SHEETS OF SYNTHETIC FOIL MATERIAL FROM EXTRUDED STRIPS JOINED TOGETHER ALONG THEIR EDGES

This is a division, of application Ser. No. 169,615, filed Aug. 6, 1971, now U.S. Pat. No. 3,765,982.

The invention relates to a process and a device for the manufacture of large webs or sheets of synthetic foil material from extruded strips joined together along their edges and which are deposited on a moving supporting device in mutually parallel relation with the adjacent edges in mutual contact while hot and in plastic condition and are joined together by welding or bonding.

The width of webs which can be directly extruded through elongated slot type dies is very limited because of the rheological and thermal problems which are encountered. In practice, large webs or sheets are therefore manufactured in accordance with the above-mentioned process by helically winding the strips round the inside or outside of a cylindrical drum and by longitudinally cutting open the tube thus formed. This process has the disadvantage that the size of the sheet that can be manufactured is determined and limited by the diameter and length of the drum. The thickness of the sheets is further extremely limited and the sheets must on no account have any projecting profiles, since they can otherwise not be changed from the cylindrical form into the desired flat shape without an unreasoabable amount of effort. The known process has finally the disadvantage that it is very difficult to thermally control because the drum must be heated at the strip depositing area in order to keep the strip previously deposited weldable until the next strip has been laid, but has to be cooled at a location slighly offset therefrom in an axial direction; it is then difficult to maintain the temperatures over the periphery at the required levels in spite of the varying convective influences of the surrounding air.

It is thus the object of the invention to provide a process of the type mentioned earlier which permits to produce webs or sheets the dimensions of which are not dependent upon the diameter of a drum and which is easier to thermally control and which allows to provide the forming of upstanding profiles on the sheet.

This object is achieved, according to the invention, by the fact that the strips are each deposited by a back and forth movement across the width of the web or sheet to be produced and that the supporting device is indexed longitudinally of the foil or sheet a distance corresponding to the width of one strip at every reversal following the deposition of a strip.

For this purpose, it is advantageous to have the support move in only one direction, namely transversely to the strip direction, and to have the strip laying device move only in the other direction, that is in the direction of the strip. At the same time as a strip is laid, a profile can be formed from or be laid on this strip or be laid on a strip previously laid, the profile basically extending parallel to the direction of the strip, although this does not exclude periodic or non-periodic variations of the parallel motion being caused by relative motion of the device producing the profile transversely to the strip direction. In particular, application of a profile can be done by applying and welding to the strip one or more separate profile strips. It is practical for the separate profile strips to be extruded as the main strip is being extruded and laid and, if possible, by the same device. It is further practical, when using thermoplastic materials, for those parts of a laid strip which have to be welded to a strip or profile strip which is laid at a later point in time, to be heated or kept warm. Such measures are of course not necessary when processing non-thermoplastic materials which, regardless of their temperature during the laying process will not harden until later, (as is the case with rubber which is to be vulcanized later). If so desired, however, other measures can be taken in order to retain or produce weldability of a laid strip to a following strip, dependent on the material being used. If bonding is preferred to welding, an adhesive, for instance, may be applied.

The surface onto which the strips are laid according to the invention should be straight in the laying direction. This means that the manufactured web or sheet does not have to be reshaped from the bent form to the flat form as is the case in known processes. If, however, it is desired to produce a web or sheet which is not straight in the strip direction but is to have any type of profile (as viewed in the feed direction of the surface), the supporting surface can be formed to correspond with this profile.

It is practical for the supporting surface to be a continuous means which extends transversely of the strip, i.e. in the direction of the sheet or web. This characteristic makes it possible to produce sheets of any length. It can, for instance, be in the form of a conveyor belt, but is preferably the circumference of a drum onto which strips are placed parallel to its axis and which is advanced in the direction of its circumference and is thus rotated by increments. While the strip is laid at one point on the drum, it is taken off the drum at another point after having been welded to preceding and following strips, i.e., after the continuous web has been formed. When thermoplastic materials are being used there is a cooling area between these two points, circumferentially subsequent to the location of initial heat maintenance, where the web is cooled sufficiently to permit it to be stripped from the drum without any risk of being distorted. It should, however, still be warm enough to exhibit the flexibility necessary for the stripping operation. When other materials are being used, a different step of treatment such as a vulcanizing step can be carried out between these two points if necessary in order to change the initial plastic state of the material to a condition of sufficient strength and dimensional stability for further treatment and especially for the stripping from the drum.

The device for laying the strip is preferably an extruder, although it may of course be a different mechanism. It could, e.g., include a carrier for a reel of a band of unvulcanized rubber and a mechanism for laying the band from the reel on the supporting surface. In any case, the device should include a mechanism for creating the bond between the strip which is being laid and the previously laid strip as long as this bond does not result by itself as the strips are laid in abutting or overlapping relation. For overlapped laying, this mechanism can for instance be in the form of a roller which acts to press or possibly to flatten the overlap.

Although the statement that, according to the invention the strip is laid in zig-zag, should be understood to mean that the strip is to be laid during both the forward and the reverse motions of the laying device in the course of the relative zig-zag motion of the surface and of the laying device, this does not exclude the possibility of the laying device being idle during one of the strokes of its motion.

If the strip is being laid during both strokes of the motion of the laying device, it is practical for the mechanism which facilitates the bonding of the strip to be laid to the previously laid strip to be provided in duplicate so that there is one for each stroke; these would then follow that part of the laying device which feeds the strip, for instance the extruder nozzle. If necessary, these two mechanisms can be automatically reversed when the direction of motion of the laying device is reversed.

The following is a more detailed description of the invention referring to the drawing which shows an advantageous version of a device to carry out the process covered by the invention.

Figure 1:
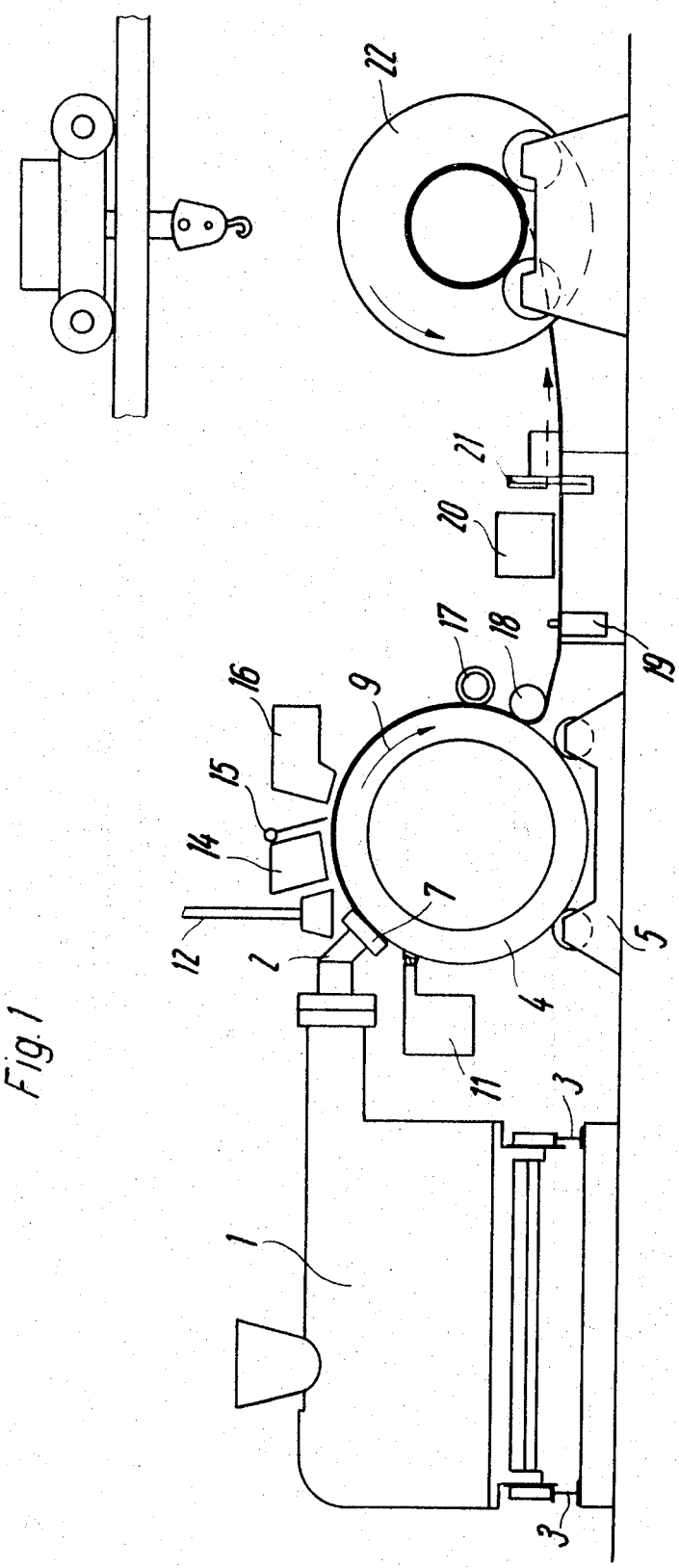
FIG. 1 is a schematic side-view.

A traditional extruder 1 with a nozzle 2 for the production of a strip of thermoplastic synthetic material, for instance PVC, can travel on rails 3 transversely to the direction of extrusion; these rails being laid in such a way that the nozzle moves in a straight line. A driving mechanism (not shown) is provided which drives the extruder at a speed synchronized with the rate of extrusion. It is preferable for the end stops of the extruder motion to be adjustable. When the extruder reaches the end stop, its direction of motion is a automatically reversed. Provision can be made for the extruder to stop for some time before continuing in the reverse direction in order to leave time for other processes to take place during reversal; this applies in particular to the drum advance. The drum is positioned parallel to the rails 3 and rotatable around its axis, for instance on rollers 5. The positioning of the drum and the extruder in relation to one another is such that the strip 6 emerging from the extruder nozzle, by virtue of appropriate angling of the nozzle, lies flat on the drum surface after a turn on an axis parallel to the die opening. The die opening should thus extend approximately parallel to the tangent on the drum surface at that point which is met by the connecting line between the centre of the die opening and the drum axis. Two pressure rollers 7 are also at a tangent and promote regular laying of the strip 6 by guiding it as it turns and by simultaneously pressing on the overlap 8 of the strip 6 being laid on the previously laid strip 6a thus facilitating welding.

The direction of advance of the drum 4 is shown by the arrow 9. Advance takes place at each reversal of the extruder motion. Such a reversal point can be seen at the strips on the drum shown in FIG. 2 at 10. The length of motion of the extruder may be adjustable. This determines the width of the web produced, the edges of which are later trimmed along with the loops formed at the reversal.

If necessary, the drum surface can be heated at that area on which the next strip is to be laid by any suitable mechanism shown as gas burners 11 in FIG. 1. Thermal radiators 12, which ensure that the laid strip remains sufficiently warm or indeed is further heated at least in that edge area where welding with the following strip is to take place, are arranged above the laying area.

These radiators can be controlled dependent on the extruder travel, because the individual sections of a strip are subjected to the influence of the radiators for time intervals of varying length during the extruder's zig-zag motion in relation to the drum surface.

Figure 3:
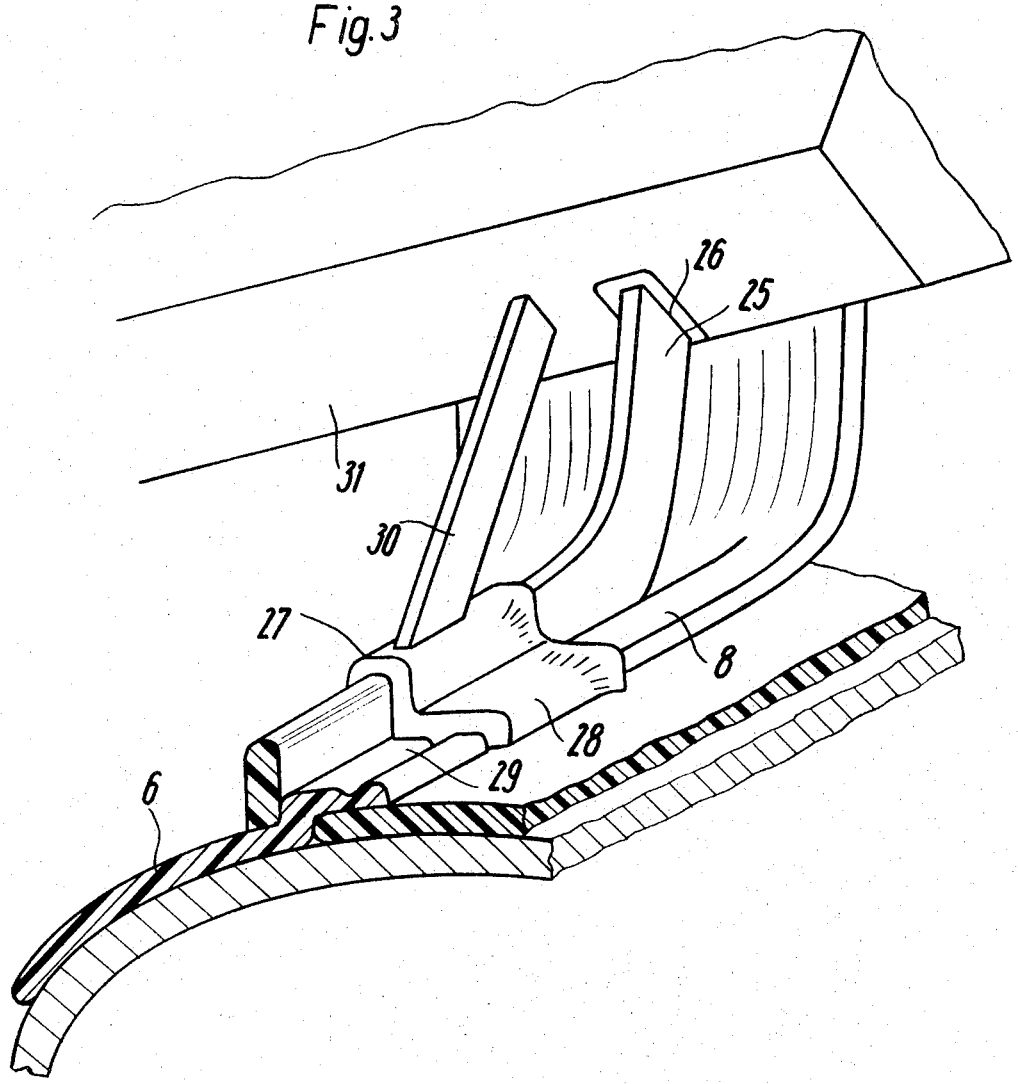
FIG. 3 is a perspective showing of one part of the device.

FIG. 3 illustrates one example of a means for placing an additional profile strip 25 on top of a deposited strip 6. This means consists of an additional die, indicated at 26, for extruding said additional profile strip 25 and a shaping shoe 27 for pressing the profile strip 25 against the strip 6 to so produce the desired bond. It further comprises, in the embodiment illustrated by way of example, a member 28 for pressing the overlapping flap 8 against the preceding strip and for producing, at the same time, a groove-like depression 29 in the overlapping flap. The shaping member 27 is retained on the extruder, indicated at 31, by a brace 30. In this manner, sheets with any desired profile, for example dovetail profiles or other laid-on profiles (or even relief profiles, as particularly required for use as insulation sheeting in the construction field) can be manufactured.

Figure 2:
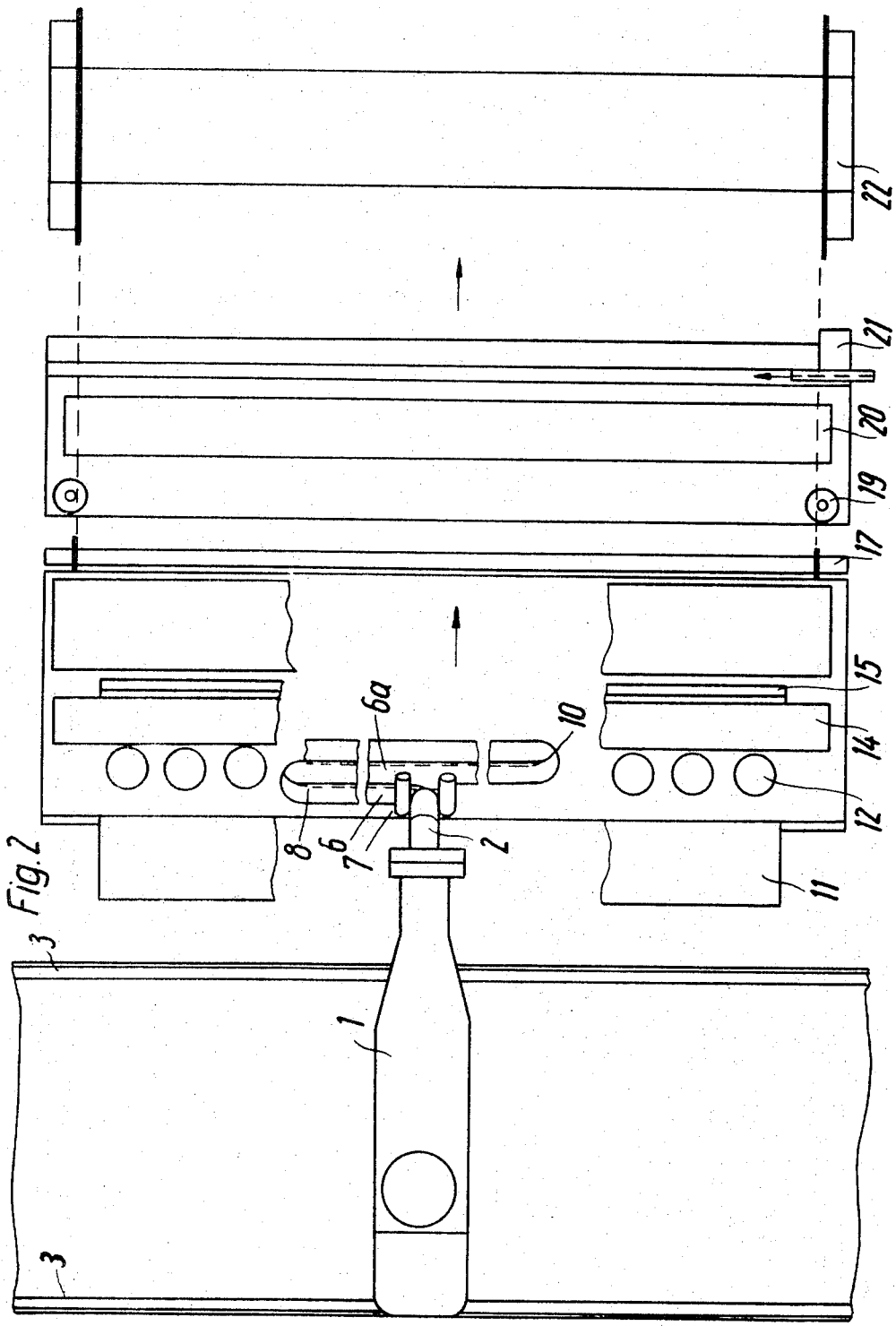
FIG. 2 is a top view of such a device with supplementary equipment.

A device for surface treatment of the web lying on the drum surface is generally shown at 14 in FIG. 1 and 2. This can comprise rollers effecting the profile of the surface, a mechanism for the lamination of a second web or a device for the attachment of a fleece surface or of bristles or similar attachments.

At 15 is to be found a screen which serves to prevent air heated in the surface area just described from exerting a convection effect on the subsequent cooling section. This cooling section can, for instance, include a mechanism 16 for blowing cold air or for spraying cold water against the drum. Cooling may, however, also be effected through the drum surface from within the drum.

At 17, a rotating cutting mechanism is shown which removes the loop edges from the web and trims it to the required width. At the take-off roller 18 the web is finally removed from the drum surface and is then led according to the requirements to a bevelling machine (edge milling device) 19 and/or a perforating and punching device 20 and/or a fly-mounted saw. A take-up device is shown at 22.

It is clear that the plant covered by the invention is composed of relatively simple components which are easily controlled. It is nevertheless capable of supplying a product which is superior to those provided by known plants as regards the characteristics described above.

When the direction of motion is reversed, the extruder production can, if desired, be stopped by means of techniques known in the art for such purposes. Moreover, all those materials known in the art to be suitable for such processes can be processed (cf. German Pat. No. 1,111,808). Above and beyond this, the process covered by the invention is generally suitable for use with such materials as have an extrudable consistency at any stage of processing or as can be given such a consistency and as will subsequently solidify, either automatically or by additional processing measures which can be carried out on the drum surface or on a continuous conveyor belt, when employed.

In contrast to the direct extrusion of wide webs, a relatively small and, as far as construction and operation is concerned, simple extruder can be used. This equipment is therefore suitable for companies with relatively limited ressources and has thus advantages in producing webs of such width which per se can only be directly extruded with correspondingly large and thus expensive extruders or extruder dies.

If desired, the strips to be bonded can be produced with varying wall thicknesses. This is even possible when using one single nozzle by driving the extruder at a different speed, i.e., the ratio between the extrusion rate and the laying speed is changed; this can be effected by changing one or both speeds. Individual strips can also be given a smaller thickness if, for instance, a specific stretch of one strip is required within a large surface.

The process according to the invention can also be used to coat another web, for instance a woven web.

We claim:

1. A device for manufacturing large webs or sheets of synthetic foil material from extruded strips joined together along their edges, comprising, frame, an extruding means having an extruder nozzle and mounted on said frame movable in a reciprocating motion, means for driving said extruding means, guide means for guiding said extruding means, said driving means moving said extruding means back and forth between first and second end positions, supporting means arranged for deposition of the extruded strip from said extruder nozzle on a surface thereof, means for moving said support means crosswise to the direction of movement of said extruding means, said means being effective to move said support means in an incremental step in a first direction each time said extruding means reaches, in its reciprocating motion, either said first or second end position, whereby said extruded strip is deposited on said support means in a series of strip portions which are in contact along adjacent edges thereof, and further comprising a plurality of pressure rollers secured in fixed relation to said extruding means and adjacent said extruder nozzle thereof, said pressure rollers guiding the extruded strip at said first and second end positions and pressing said strip portion being laid adjacent the strip portion just previously laid and along the adjacent edges thereof to facilitate the welding together of said strip portions.

2. A device for manufacturing large webs or sheets of synthetic foil material from extruded strips joined together along their edges, comprising, a frame, an extruding means having an extruder nozzle and mounted on said frame movable in a reciprocating motion, means for driving said extruding means, guide means for guiding said extruding means, said driving means moving said extruding means back and forth between first and second end positions, supporting means arranged for deposition of the extruded strip from said extruder nozzle on a surface thereof, means for moving said support means crosswise to the direction of movement of said extruding means, said means being effective to move said support means in an incremental step in a first direction each time said extruding means reaches, in its reciprocating motion, either said first or second end position, whereby said extruded strip is deposited on said support means in a series of strip portions which are in contact along adjacent edges thereof, and at least one pressure roller associated with said extruder means and operable to press the adjacent edges of the respective strips together to thereby form the large webs or sheets.

3. A device as defined in claim 2, wherein said supporting means is a drum mounted for rotation adjacent said extruding means.

4. A device as claimed in claim 2 wherein said supporting means is a flat member.

5. A device as defined in claim 4, wherein a surface on said supporting means is continuous and extends transversely with respect to the direction of the strip portions deposited thereon.

6. A device as claimed in claim 2 further comprising a second extruder nozzle on said extruding means and disposed for the deposition of another extruded strip on the strip deposited by said extruder nozzle, and a die carried on said extruding means and adapted to press said another extruded strip onto the extruded strip deposited by said extruder nozzle.

7. A device as claimed in claim 6, wherein said die has a portion for shaping a profile strip from said another extruded strip.

8. A device as defined in claim 7, wherein said die has another portion for shaping a surface of said extruded strip along the adjacent edges thereof.

* * * * *